INVENTOR
FRANK J. YARSA

United States Patent Office 3,529,979
Patented Sept. 22, 1970

3,529,979
METHOD OF PREPARING ALKALI SAND PRODUCTS
Frank J. Yarsa, Barberton, Ohio, assignor to PPG Industries, Inc., Pittsburgh, Pa., a corporation of Pennsylvania
Filed Oct. 26, 1966, Ser. No. 589,593
Int. Cl. C03c 3/04
U.S. Cl. 106—52                        7 Claims

ABSTRACT OF THE DISCLOSURE

A product useful in the manufacture of glass is prepared by fluidizing a bed of sand particles and alkali metal hydroxide in the presence of $CO_2$ while the temperature is such that hydroxide and sand react to form alkali metal silicate. Sufficient $CO_2$ is supplied to react with unreacted alkali metal hydroxide to form alkali metal carbonate.

---

The present invention relates to the manufacture of glass. More particularly, the present invention relates to glass batching. Still more particularly, the present invention relates to a method of preparing glass batch utilizing large quantities of caustic soda.

In U.S. Pat. 3,149,983 a process is described in which caustic soda is utilized for the purpose of providing soda ash equivalent in glass batch. While caustic soda has been proposed for many years as a replacement for the soda ash constituent in glass batch, the fact that it is added as a solution seriously detracts from its utilization. Solutions place a limitation on the quantity of caustic soda that can be utilized due to the fact that glass batch containing large quantities of caustic soda would become excessively damp and difficult to handle.

In accordance with the instant invention a process is provided which permits the utilization of caustic soda in glass batch. The invention provides for the manufacture of a product which can be utilized in a glass batching operation to provide sand and alkali requirements for glass batch. The product is also suitable for use as feed to a silicate furnace such as used in the manufacture of sodium silicate and the "manufacture of glass" referred to herein is intended to include the manufacture of sodium silicate in melting furnaces.

Thus, in accordance with the instant invention a product is provided which contains silicon dioxide, sodium carbonate as well as quantities of sodium silicate typically 10 to 40 percent by weight. It will become apparent from the description that the utilization of the product in the instant invention gives rise to many distinctive advantages in the handling of glass batch and in the melting thereof. In addition, the process of the instant invention provides a glass batch product which by micro-photograph reveals that it consists essentially of sand grains which are totally encased in alkali shells. This product due to the fluxing action of the alkali during melting provides excellent heat transfer to the difficult to melt sand grains because of the intimate contact of alkali and sand and a consequent rapid and efficient melting of the sand grain.

Figure 1:
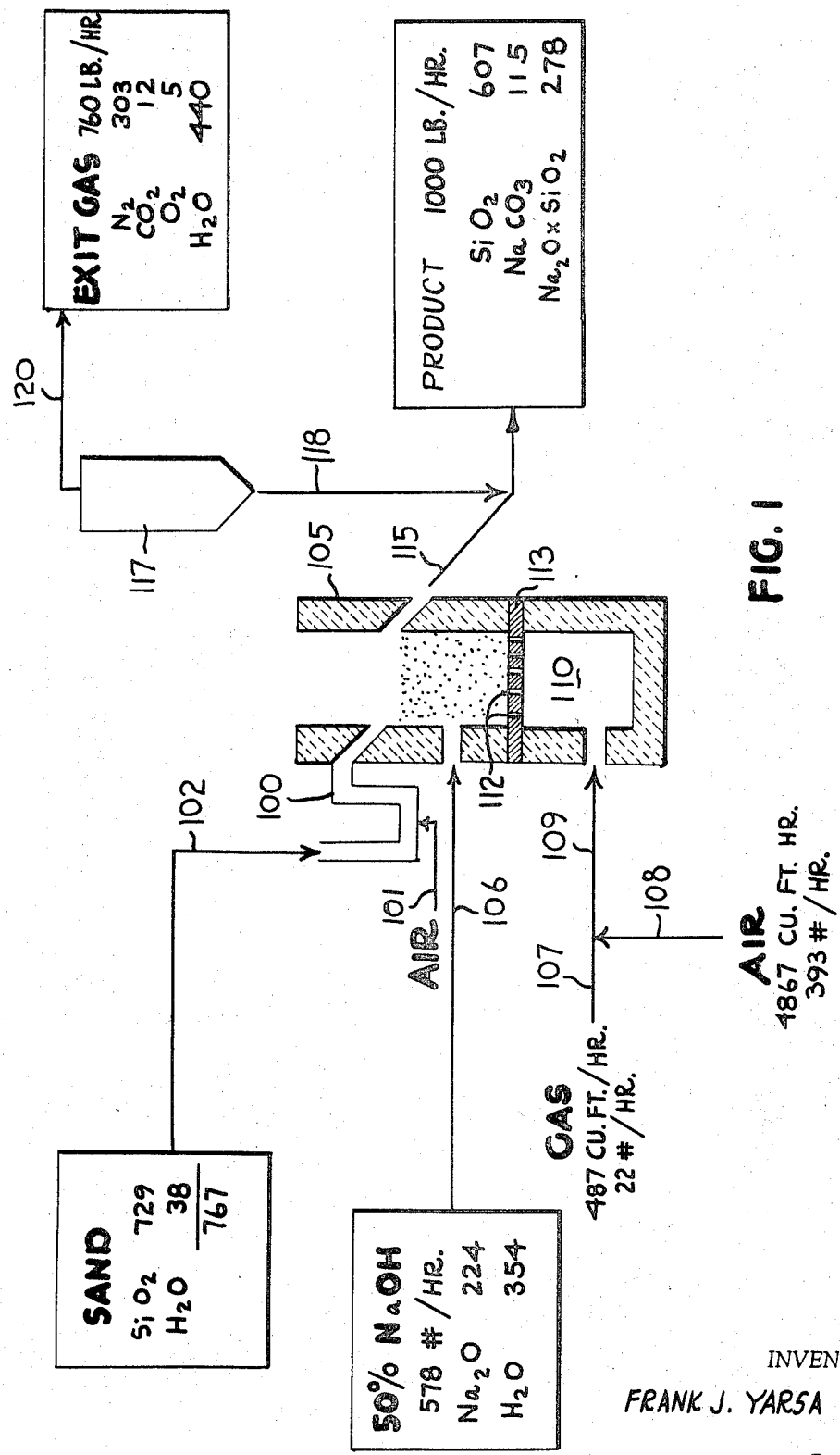
Figure 2:
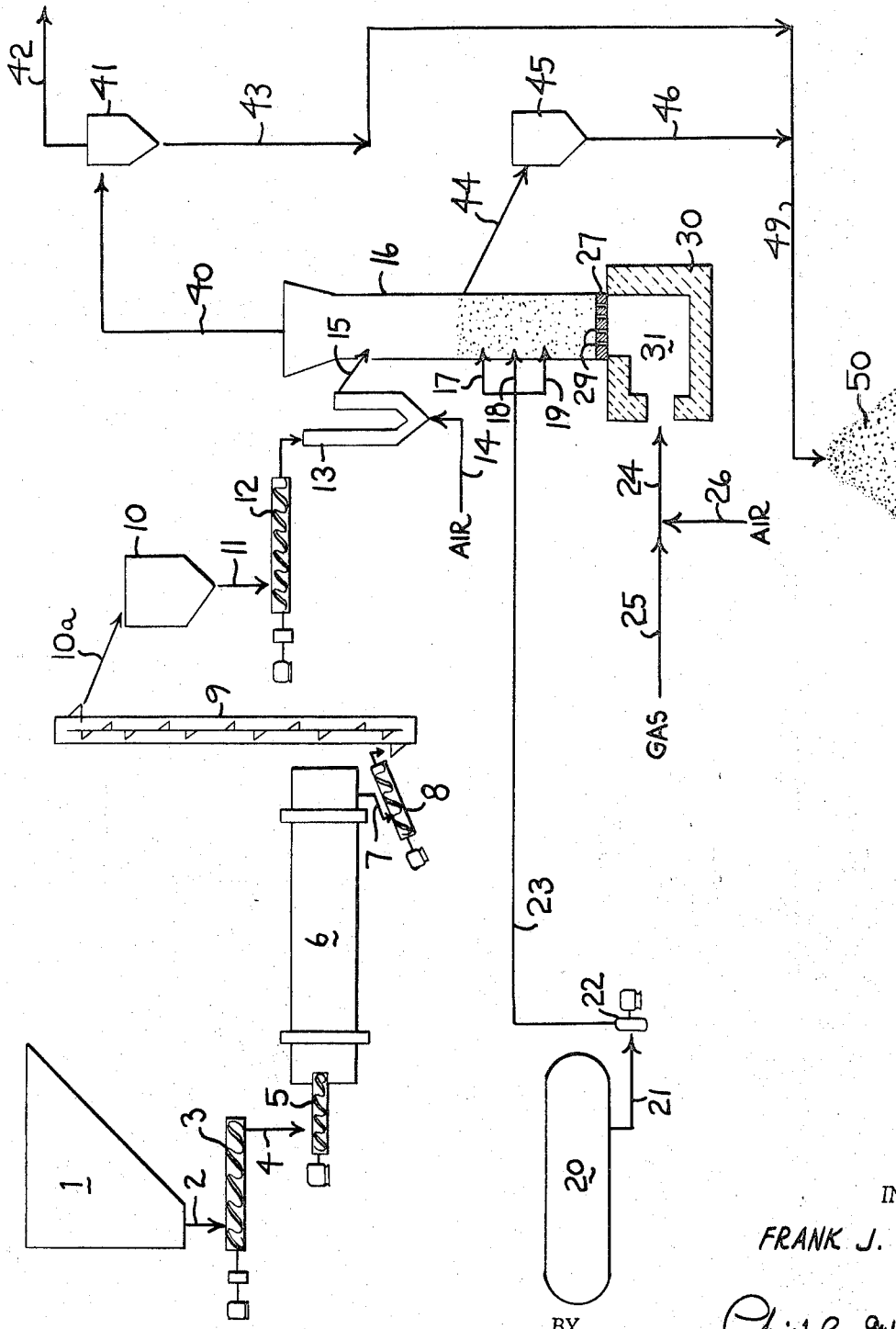

For a more complete understanding of the present invention reference is made to the accompanying drawings in which:

FIG. 1 represents a diagrammatic illustration of a unit utilized to produce a specific product, and FIG. 2 represents a train of equipment used to produce a product in accordance with the present invention and illustrating some of the auxiliary equipment utilized for the fluidized operation.

Turning now to the figures especially with particularity to FIG. 2, there is shown a wet sand storage bin 1 from which sand is discharged via line 2 into a feed screw 3. From feed screw 3 the sand particles are fed via line 4 to the screw conveyer 5 and from there enter a direct fired rotary sand dryer 6. At the end of the direct fired rotary sand dryer is a discharged line 7 from which the sand is conveyed to a screw conveyer 8 and from there to a dry sand elevator 9. From dry sand elevator 9 the sand is lifted to the top and is discharged via line 10a to a sand storage bin 10. The storage bin 10 is provided with a discharge 11 connected to a feed screw 12 and from there sand enters a fluid bed feeder 13. Fluid bed feeder 13 is provided with an air inlet 14 and an outlet 15 which outlet is connected to fluidized bed reactor 16. The sand discharged into the fluid bed feeder 13 is lifted by the air entering line 14 and discharged through line 15 to the fluidized bed reactor 16.

The fluidized bed reactor 16 is provided with liquid feed ports or lines 17, 18 and 19 which are connected to a caustic storage tank 20. Caustic storage tank 20 is provided with a discharge line 21 connected to a pump 22 and pump 22 is connected via line 23 to the inlet lines 17, 18 and 19. Fluidized bed 16 is provided with a distributor plate 27 having appropriate apertures 29 therein and is provided at its under portion with a windbox 30. Gas and air are fed via lines 25 and 26, respectively, to line 24 where they enter the chamber 31 of the windbox 30. In this manner the requisite quantity and velocity of gas is provided to the fluidized bed 16 to maintain fluidization of the sand particles contained therein and they are wetted by the caustic soda fed through lines 17, 18 and 19. Fine particles are discharged from the reactor 16 via line 40 and enter a cyclone dust collector device 41 where the gases are discharged through line 42 and the solid products are collected via line 43 and coupled with other products to provide the frit product. The fluidized bed product is discharged continuously from the fluidized bed of particles in reactor 16 via line 44 into a gas lock surge bin 45. This product is discharged via line 46 to line 49 and ultimately stored at 50.

Turning to FIG. 1 the operation of this process will now be described with reference to a specific embodiment, emphasis being placed on the operation of the fluidized bed. Sand of the composition $SiO_2$, 729 pounds and $H_2O$, 38 pounds comprising a total of 767 pounds is fed into a fluidized bed feeder 100. Air enters the fluidized bed feeder via line 101 and is fed at a velocity sufficient to cause the sand particles being fed via line 102 to the feeder 100 to rise in the feeder and enter the fluidized bed reactor 105. Caustic soda at the rate of 578 pounds per hour which represents 224 pounds $Na_2O$ and 354 pounds $H_2O$ enters line 106 and from there is fed to the bed reactor 105. Natural gas at the rate of 487 cubic feet per hour or 22 pounds per hour and air at the rate of 4,867 cubic feet per hour or 393 pounds per hour are fed through lines 107 and 108, respectively and enter line 109. The gases are introduced into chamber or windbox 110 of the fluidized bed reactor 105. The gases pass upwardly through apertures 112 in the distributor plate 113 and fluidize the sand particles in the reactor 105. In the upper portion of the fluidized bed a solids discharge line 115 is provided. Product at a rate of 1,000 pounds per hour is produced and is removed via line 115 to storage. The gas exiting via line 116 enters cyclone 117. The solid particles being discharged via line 118 are coupled with the solid products in line 115 and the gas is discharged via line 120.

In the operation of the instant invention fluidized bed temperatures are maintained typically from 400° F. to 700° F., preferably from 550° F. to 650° F. The windbox 110 shown in FIG. 1 is in reality a combustion chamber. Operating the combustion chamber roughly in the neighborhood of 1,000° F. to 2,200° F. provides bed temperatures within the typical range.

Utilizing the example described above with respect to FIG. 1, many runs were made for the purpose of evaluating the product. The percent $SiO_2$ reacted, the ratio of $SiO_2$ to $Na_2O$ encountered, the feed rate average, and the average fluid bed temperatures were recorded. This information is contained in Table I.

TABLE I

| Run No. | Percent $SiO_2$ reacted | Ratio, $SiO_2/Na_2O$ | Feed rate, average | Fluid bed, average temperature, °F. |
|---|---|---|---|---|
| 1 | 12.17 | 3.38 | 347 | 568 |
| 2 | 10.88 | 3.65 | 435 | 593 |
| 3 | 9.30 | 3.21 | 525 | 560 |
| 4 | 9.03 | 3.34 | 580 | 562 |
| 5 | 5.70 | 4.13 | 435 | 546 |
| 6 | 11.75 | 3.30 | 492 | 588 |
| 7 | 11.72 | 3.06 | 554 | 574 |
| 8 | 12.15 | 3.17 | 456 | 583 |
| 9 | 10.44 | 3.64 | 534 | 592 |
| 10 | 9.61 | 3.84 | 594 | 592 |
| 11 | 8.84 | 4.48 | 660 | 582 |
| 12 | 9.00 | 4.31 | 654 | 593 |
| 13 | 7.55 | 4.57 | 660 | 576 |
| 14 | 8.36 | 4.45 | 546 | 575 |
| 15 | 11.07 | 3.18 | 498 | 606 |
| 16 | 9.68 | 3.60 | 540 | 579 |
| 17 | 9.75 | 4.10 | 540 | 583 |
| 18 | 8.57 | 4.21 | 390 | 593 |
| 19 | 10.18 | 3.78 | 432 | 586 |
| 20 | 8.91 | 4.02 | 606 | 589 |
| 21 | 9.45 | 3.64 | 654 | 587 |
| 22 | 11.79 | 3.32 | 666 | 593 |
| 23 | 10.62 | 3.46 | 666 | 591 |
| 24 | 11.33 | 3.40 | 562 | 594 |
| 25 | 11.10 | 3.63 | 577 | 577 |
| 26 | 10.65 | 3.66 | 579 | 579 |

The fluidized bed product produced in accordance with this process was compared in a silicate furnace for the purpose of determining its melting characteristics compared to normal batch, that is, batch produced by dry mixing with sodium carbonate as the $Na_2O$ supplier. The results of this comparison is set forth in Table II.

TABLE II

| Period | Time (hrs.) | Feed | Product rate (ton/day) | Reading gas flow (west) | Furnace cap temperature North | Furnace cap temperature South | Comparative fuel, s.c.f.h./ton |
|---|---|---|---|---|---|---|---|
| 1 | 30 | Regular | 179 | 54.3 | 2,625 | 2,415 | 8,800 |
| 2 | 25 | Product | 213 | 53.1 | 2,670 | 2,450 | 7,300 |
| 3 | 25 | Product | 163 | 49.7 | 2,730 | 2,485 | 8,900 |
| 4 | 20 | Regular | 159 | 51.9 | 2,680 | 2,470 | 9,500 |

Micro-photographs taken of the product using polarized light showed sand particles apparently totally encased in alkali.

The particular quantity of caustic soda utilized or the quantity of sand utilized to produce the product of the instant invention may be varied widely. Generally sand and alkali are combined in those proportions required for a given glass batch. The product is then mixed with any other glass batch ingredients desired and fed to a glass melting furnace for the purpose of providing the glass product desired.

In conducting the instant process control is exerted on the system in order to produce a product which is substantially non-hygroscopic. Thus, combustion gases are employed in the fluidized bed to insure that all caustic present as NaOH is removed in the product in the form of a sodium silicate or a sodium carbonate. The carbonate formation results from reactions of $CO_2$ in the combustion gases with NaOH during passage of the gas through the bed.

Typically, in conducting the instant process temperatures above the temperatures at which sodium hydroxide reacts with sand to produce sodium silicate are employed. Generally, temperatures above 500° F. are found to be convenient. In conducting the instant process an excellent practical range of temperatures was found between 510° F. to 700° F. The temperatures employed can be varied from the above values if desired and temperatures above 700° F. and even temperatures below 500° F. can be used. Temperatures can be used to provide for the formation of more sodium silicate using the general guide that higher temperatures favor the formation of more sodium silicate and lower temperatures less sodium silicate. Thus, at 600° F. should 25 percent of the product be in the form of a sodium silicate, an increase in temperature above 600° F. would produce more sodium silicate in the product. Similarly a reduction in temperature below 600° F. will result in less sodium silicate being produced.

Operating with a steady silica to alkali ratio while employing a $CO_2$ containing hot gas in the fluid bed, a product is obtained which is substantially free of NaOH and which can contain any desired amount of $Na_2CO_3$. This gives rise to a product that is non-hygroscopic and quite easily incorporated into a glass batching operation. To provide the necessary temperature to the fluid bed systems herein contemplated for optimum performance the combustion gases in the combustion chambers typically located below the bed as shown in the accompanying drawing are generally on the order of 1000° F. to 2200° F.

The $CO_2$ is conveniently supplied by hot combustion gases located typically near the fluidized bed. In general, the gases passed through the fluidized beds in accordance with the instant invention contain about 2 percent $CO_2$ by volume or more. Generally 5 to 10 percent by volume $CO_2$ is present in the fluidizing gas stream passing through the bed. While more or less than the above quantities can be employed, these values typify the usual combustion gases encountered. So long as sufficient $CO_2$ is present to react with the alkali metal hydroxide in the bed of particles being fluidized, the gas stream will be adequate.

In operation of the fluid bed a particularly effective method of control is established by titrating samples of the overflow for alkalinity based on the desired product. Thus, in producing a product containing 61.5 percent unreacted sand, 10 percent reacted sand, 22 percent $Na_2O$ and 6.5 percent $CO_2$, it is calculated that 35.5 cubic centimeters of a 1 N HCl solution will be required to titrate 5 grams of that product to neutrality. Thus, by determining the alkalinity of the desired product, positive control can be maintained on the system and adjustments can be made to caustic or sand feeds to the fluidized beds when the alkalinity of the product departs from the value of the desired product.

In operation of the instant system for the manufacture of sodium silicate a weight ratio of $SiO_2$ to $Na_2O$ of 3.23 was desired. The particular weight ratio of $SiO_2$ to $Na_2O$ however can be varied widely and will depend upon the particular use to which the product is to be put. Thus, in glass making operation the ratio will approximate the ratio of these materials desired in the finished glass product. Once it has been established that a given ratio of $SiO_2$ to $Na_2O$ is desired the adjustments of feeds to produce this ratio is made. Minor deviations in the established ratio as determined by analysis can be corrected by temperature control, higher temperatures favoring more reaction of silica in the feed to produce silicate and lower temperatures favoring less reaction and consequently less silicate formation.

As will be readily understood by the skilled art many modifications in the herein described process can be made without departing from the spirit of the invention. Thus, for example, in lieu of combustion gases only, beds can be fluidized with auxiliary gas streams where feasible or desirable. In conducting the reactions herein described the important consideration is the presence of sufficient $CO_2$ in the fluidizing gas stream in the bed to react with NaOH which has not reacted with sand. This is typically a quantity of $CO_2$ stoichiometrically equivalent to the unreacted NaOH present in the bed.

Caustic liquors fed to the instant system are widely variable and are typically solutions of caustic ranging between 35 percent to about 70 percent by weight. Solutions below the 35 percent concentration can be employed but are not preferred. Preferably 50 percent caustic is employed. The caustic solution when used with respect to glass compositions as well as sodium silicate furnace feed stocks can be employed as a total replacement for the normal soda ash content of that batch. In the preferred embodiments of this invention total alkali content of the product is supplied using aqueous sodium hydroxide solutions. If desired, however, partial replacement of alkali equivalents in batch, both glass making and sodium silicate making batches, can be undertaken.

In similar fashion where desired, automatic control of feed ratios can be placed upon the system to respond to automatic titrating equipment which may be utilized to control that ratio by titrating the product as it is produced. Thus, a continuous control of feed ratios by continuous analysis of the alkalinity of the product is contemplated by the instant discovery and is easily adaptable to the system shown and described herein by recourse to standard titrating apparatus and suitable electrical and/or mechanical control instrumentation of feed lines.

I claim:

1. A method of preparing a product containing sand, alkali metal silicate and alkali metal carbonate comprising fluidizing a bed of sand particles and alkali metal hydroxide in the presence of a $CO_2$ containing gas, maintaining said bed above that temperature at which sand and alkali metal hydroxide react to form alkali metal silicate to produce alkali metal silicate by partial reaction of the alkali metal hydroxide and sand, and in the fluidized bed reacting unreacted alkali metal hydroxide with carbon dioxide to form alkali metal carbonate.

2. The method of claim 1 wherein the alkali metal hydroxide is sodium hydroxide, from about 5 to about 12 percent of the sand is reacted, and the $SiO_2$ to $Na_2O$ ratio is between about 3 and 4.5.

3. A method of preparing a product containing both alkali metal silicate and alkali metal carbonate comprising adding an aqueous solution of alkali metal hydroxide to a bed of fluidized sand particles maintained at from 400° F. to 700° F. to thereby cause said sand particles to react with a portion of said hydroxide and produce alkali metal silicate while providing as a fluidizing medium a gas stream of $CO_2$ containing sufficient $CO_2$ to form alkali metal carbonate by reaction with alkali metal hydroxide to thereby convert unreacted hydroxide to carbonate and removing from said bed a product containing alkali metal silicate and alkali metal carbonate but substantially no hydroxide and being substantially nonhygroscopic.

4. A method of producing a sodium silicate containing product comprising fluidizing a bed of sand particles with hot combustion gases containing a substantial amount of $CO_2$, maintaining said bed at between 400° F. and 700° F., adding to said bed sufficient sodium hydroxide as an aqueous solution to provide for a desired $Na_2O$ to $SiO_2$ ratio in the product based on the quantity of sand in said bed to thereby cause sand particles to react with a portion of said hydroxide and produce sodium silicate and to form sodium carbonate by reaction of $CO_2$ in the gases with unreacted sodium hydroxide, testing the product of the fluid bed for alkalinity to determine its $Na_2O$ to $SiO_2$ ratio, and in response thereto adjusting the feed ratio of sand and sodium hydroxide to said bed when deviations from the desired alkalinity are so determined.

5. The method of claim 4 wherein the aqueous solution of sodium hydroxide contains 35 to 70 weight percent NaOH.

6. A method of preparing a product containing sand, alkali metal silicate and alkali metal carbonate which comprises fluidizing in the presence of a $CO_2$ containing gas a bed of sand particles and alkali metal hydroxide while feeding aqueous alkali metal hydroxide and sand to the bed, maintaining the fluidized bed above that temperature at which sand and alkali metal hydroxide react to form alkali metal silicate whereby to produce alkali metal silicate by reaction of a portion of the alkali metal hydroxide fed to the bed, the amount of $CO_2$ present in the bed being sufficient to form alkali metal carbonate from alkali metal hydroxide in the bed which has not reacted with the sand, and withdrawing from said bed a product containing sand, alkali metal silicate and alkali metal carbonate.

7. The method of claim 6 wherein the alkali metal hydroxide is sodium hydroxide and the fluidizing gas contains between 5 and 10 percent by volume $CO_2$.

References Cited

UNITED STATES PATENTS

| 3,451,831 | 6/1969 | Miche | 106—52 |
| 2,352,738 | 7/1944 | Ruthruff | 23—110.1 |
| 2,600,253 | 6/1952 | Lutz. | |
| 2,869,985 | 1/1959 | Gooding et al. | |

FOREIGN PATENTS

| 662,471 | 8/1965 | Belgium. |

HELEN M. McCARTHY, Primary Examiner

U.S. Cl. X.R.

23—110.1